(12) United States Patent
Canter

(10) Patent No.: US 8,180,053 B1
(45) Date of Patent: May 15, 2012

(54) SECURE COMMUNICATIONS SYSTEM WITH ASSURED SYNCHRONIZATION FOR DATA EXCHANGED AMONG SYSTEM PORTS

(75) Inventor: Jeffrey B. Canter, West Orange, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/783,614

(22) Filed: May 20, 2010

Related U.S. Application Data

(63) Continuation-in-part of application No. 11/659,670, filed on Feb. 7, 2007, now Pat. No. 7,751,566.

(51) Int. Cl.
  *H04K 1/00* (2006.01)
(52) U.S. Cl. .......................... 380/257; 713/166; 713/153
(58) Field of Classification Search .................. 713/166, 713/153; 380/257
  See application file for complete search history.

(56) References Cited

U.S. PATENT DOCUMENTS

| | | | |
|---|---|---|---|
| 4,306,287 A | | 12/1981 | Huang |
| 4,791,629 A | * | 12/1988 | Burns et al. .................... 370/363 |
| 5,063,521 A | * | 11/1991 | Peterson et al. ................. 706/34 |
| 5,452,261 A | | 9/1995 | Chung et al. |
| 5,880,992 A | | 3/1999 | Lee |
| 7,751,566 B2 | | 7/2010 | Canter et al. |
| 2003/0110344 A1 | * | 6/2003 | Szczepanek et al. ......... 711/100 |
| 2004/0052372 A1 | | 3/2004 | Jakoubek |
| 2004/0225883 A1 | | 11/2004 | Weller et al. |
| 2005/0058149 A1 | | 3/2005 | Howe |

* cited by examiner

*Primary Examiner* — Eleni Shiferaw
*Assistant Examiner* — Paul Callahan
(74) *Attorney, Agent, or Firm* — Leo Zucker

(57) ABSTRACT

A secure communications system has at least one processor and a control bus. A number of ports, each having a different fixed address, are coupled to the control bus. The processor assigns each port the address of another port whose data the port is permitted to receive when placed on a system data bus by the other port. A time slot generator outputs each fixed port address sequentially during corresponding time slots in a recurring manner, and a time slot bus is coupled to the time slot generator and to each of the ports. The ports are configured so that (a) when a given port detects its fixed address on the time slot bus, it writes desired outbound data on the data bus, and (b) when the given port detects its assigned port address on the time slot bus, the given port reads data off the data bus.

16 Claims, 9 Drawing Sheets

SECURE COMMUNICATIONS SYSTEM WITH ASSURED SYNCHRONIZATION FOR DATA EXCHANGED AMONG SYSTEM PORTS

CROSS-REFERENCE TO RELATED APPLICATION

The present application is a continuation-in-part (CIP) of commonly owned U.S. patent application Ser. No. 11/659,670 filed Feb. 7, 2007, now U.S. Pat. No. 7,751,566, titled Apparatus Using a Time Division Multiple Access Bus for Providing Multiple Levels of Security in a Communications System. The '670 application claims priority under 35 U.S.C. Sec. 119(e) of U.S. Provisional Patent Application No. 60/684,693 filed May 26, 2005.

STATEMENT OF GOVERNMENT INTEREST

This invention was made with United States Government support under Contract No. FA8726-08-C-0008 awarded by United States Department of Defense. The United States Government has certain rights in this invention.

BACKGROUND OF THE INVENTION

1. Field of the Invention

The present invention relates to TDM and TDMA communications systems or networks that can provide multiple levels of security (MLS).

2. Discussion of the Known Art

Present secure communications systems, whether for military, industrial, commercial, or private use, typically require separate physical sub-systems for each security level supported depending upon the kind of information to be communicated and the parties involved in the communications. Different levels of security are defined, for example, in DOD 5200.28-STD entitled Department Of Defense Trusted Computer System Evaluation Criteria (December 1985). In broad terms, the security levels are characterized by four divisions, namely, Divisions A to D. Division A is the highest protection and is known as Verified Protection. The next level, Division B, is Mandatory protection; followed by Division C, Discretionary Protection; followed by the lowest level, Division D, Minimal Protection.

The above DOD Standard also provides mandatory access control requirements for the different levels of security. Particularly in the military, the DOD, and governmental agencies such as NASA, hierarchical mandatory access control is required. Moreover, hospitals and commercial companies may require non-hierarchical mandatory access control to be maintained for their information or materials.

U.S. patent application Ser. No. 10/837,790, filed May 3, 2004, titled Method and Apparatus Providing Multiple Single Levels of Security for Distributed Processing in Communication Systems and assigned to the assignee of the present application and invention, describes the use of multiple single levels of security (MSLS) in the Joint Tactical Radio System, known under the acronym JTRS. Prior MSLS systems required involved security certifications and typically had inadequate networking capability. Accordingly, the inventors of the '790 application recognized the need for a MSLS system capable of meeting all the security requirements for such systems, as well as permitting the distribution of secure intelligence and information with minimal security certification efforts and providing networking functionality between channels operating with the same security label.

Specifically, the '790 application discloses a communications system wherein a physical switch provides multiple single levels of security. In the disclosed system, all switching is centralized and separate cables must be run between a central control location and all the individual ports and channels of the system, however. It would therefore be more efficient and economical if all the ports and channels of the system can be connected using only a single cable. The system of the '790 application also requires physical separation of signals, thus limiting the number of possible connections to the available routing resources. It would therefore be desirable to use bandwidth resources instead, thus allowing for a larger number of interconnects in the same resource space.

SUMMARY OF THE INVENTION

According to the invention, a secure communications system or network includes at least one processor or controller for implementing a desired security policy and controlling system operations, and a control bus coupled to the processor. Each one of two or more system ports coupled to the control bus has a unique fixed port address, and a given port is permitted to transmit information or data only another port to which the address of the given port has been assigned.

The system processor is operative to assign the given port the address of another port whose transmitted information or data the given port is permitted to receive, and a data bus is arranged to communicate data among the ports as permitted by the system.

A time slot generator is constructed and arranged to output each of the fixed addresses of the ports in sequence each within a corresponding time slot, and in a recurring manner. A time slot bus is coupled to the time slot generator and to each of the ports, and each port is configured so that (a) when a given port detects the presence of its fixed address on the time slot bus during a corresponding time slot, the port writes desired outbound data onto the data bus during the time slot, and (b) when the given port detects the presence of the port address assigned to the given port on the time slot bus during a corresponding time slot, the given port reads data off of the data bus during the time slot. The time slot bus is preferably configured as a read only bus, so that the ports can read data from but not write data to the time slot bus.

For a better understanding of the invention, reference is made to the following description taken in conjunction with the accompanying drawing and the appended claims.

DETAILED DESCRIPTION OF THE INVENTION

Figure 1:
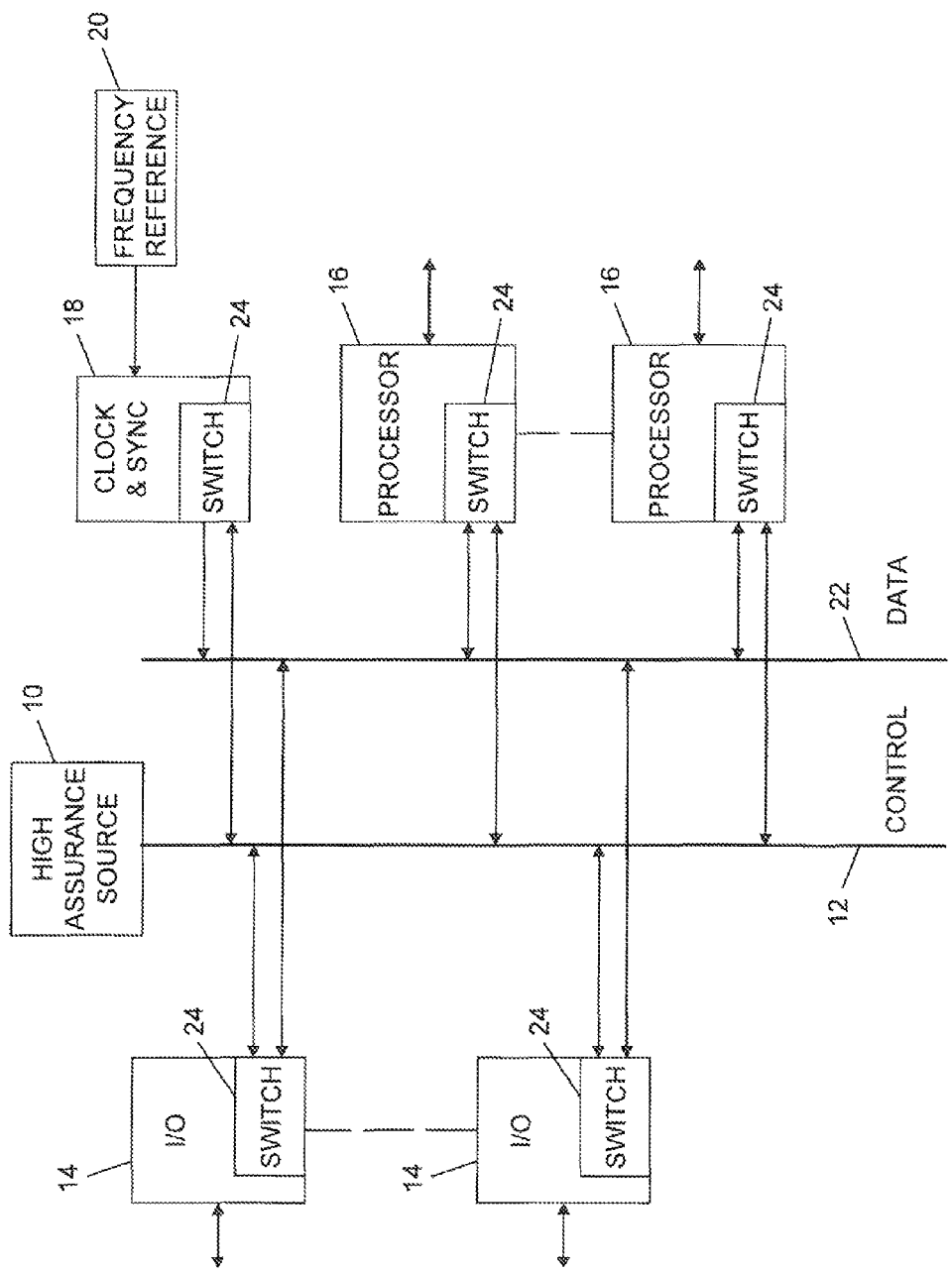
FIG. 1 is a block diagram depicting a first illustrative embodiment of a system according to the invention, including a distributed architecture with separate control and data buses.

FIG. 1 illustrates the present invention as applied to a system having a distributed architecture with separate serial control and data buses. Under certain circumstances, the use of a serial bus is advantageous over the use of separate cabling to a plurality of peripheral devices because only a single cable has to be run to connect to all of the peripheral devices. System control is effected by the high assurance source 10, which ensures that only those peripheral devices having the same designated security level can communicate with each other. Thus, the high assurance source 10 is connected to the control bus 12, which is a serial bus extending to all the peripheral devices of the system.

In FIG. 1, the peripheral devices are the ports 14, shown on the left side of the control bus 12 and labeled I/O, and the channels 16, shown on the right side of the control bus 12 and labeled PROCESSOR. In addition, there is a clock and sync circuit 18 connected to the control bus 12 and receiving input signals from a frequency reference circuit 20. The system also includes a separate serial time division multiple access (TDMA) data bus 22 extending to all the ports 14 and the channels 16, as well as to the clock and sync circuit 18. The clock and sync circuit 18 is operative to provide configuration signals on the data bus 22 to define a plurality of time slots.

Figure 4:
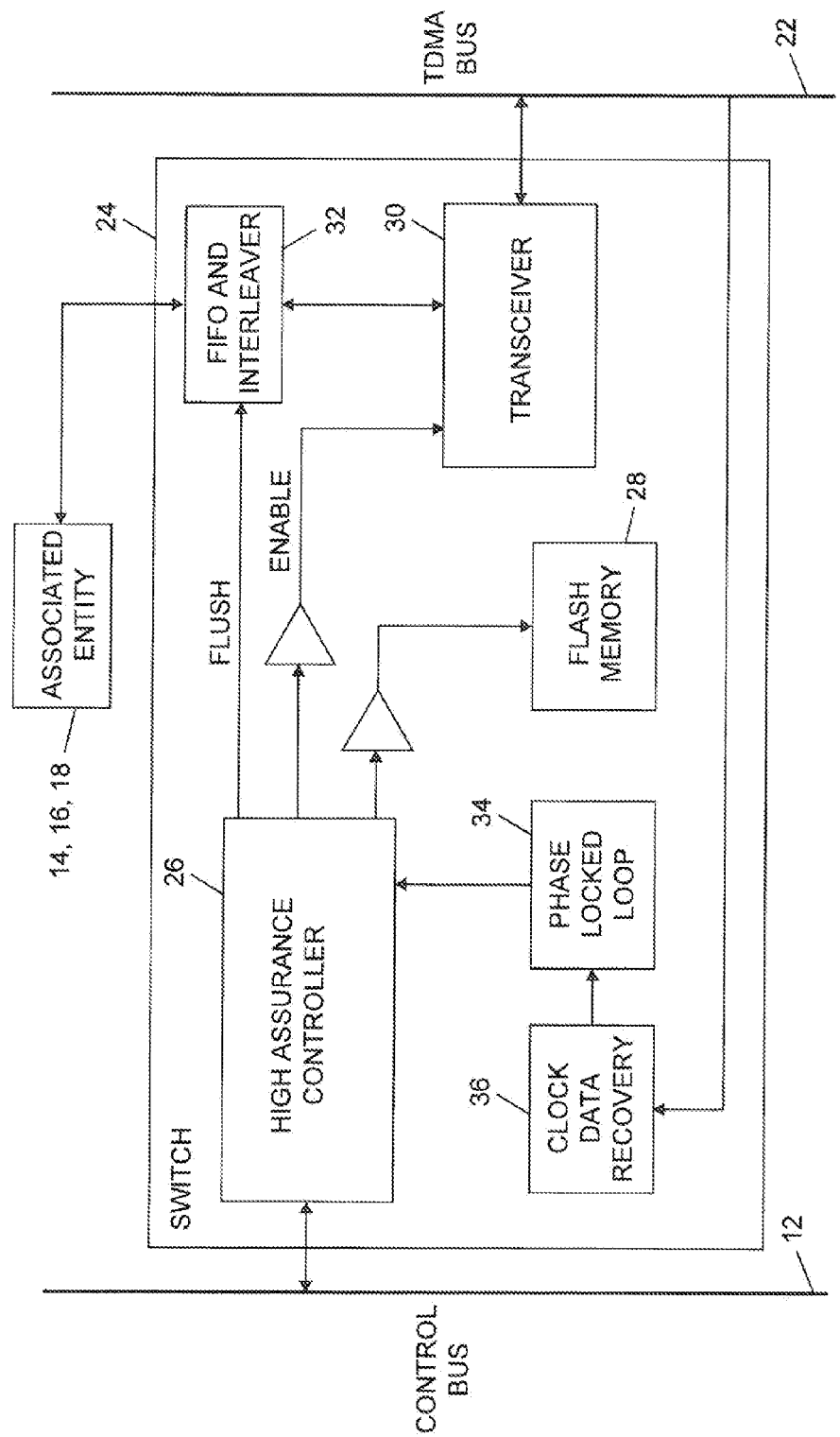
FIG. 4 is a block diagram of an illustrative embodiment of a switch unit according to the invention which may be utilized in the system shown in FIG. 1.

Each of the peripheral devices (each also hereinafter referred to as an entity) 14, 16, 18 has an internal switch unit 24 which provides the direct, and only, connection between each associated entity and the buses 12 and 22. As shown in FIG. 4, each switch unit 24 includes a controller 26 for receiving time slot assignments (both receive and transmit) over the control bus 12 from the high assurance source 10, and a memory 28 for storing the time slot assignments. The switch unit 24 also includes a transceiver 30 coupled to the data bus 22 and a first-in-first-out (FIFO) register and interleaver 32 coupled between the transceiver 30 and the associated entity 14, 16, 18. A phase locked loop circuit 34 and a clock data recovery circuit 36 retrieve timing signals over the data bus 22 from the clock and sync circuit 18.

In operation, when a particular port 14 desires to communicate with a particular channel 16, the high assurance source 10 checks to see if the port and the channel have the same designated security level. If not, a connection is not set up. If the security levels match, the high assurance source 10 assigns, over the control bus 12, receive and transmit time slots to the switch units 24 of the particular port and channel. Specifically, the receive time slot assigned for the switch unit 24 of the particular port 14, is the same as the transmit time slot assigned for the switch unit of the particular channel 16. Also, the transmit time slot assigned for the switch unit 24 of the particular port 14, is the same as the receive time slot assigned for the switch unit of the particular channel 16. Accordingly, each entity will be connected to the data bus 22 only during its assigned receive and transmit time slots. For networking, one transmitter and multiple receivers are allowable, provided that the security levels match.

Figure 2:
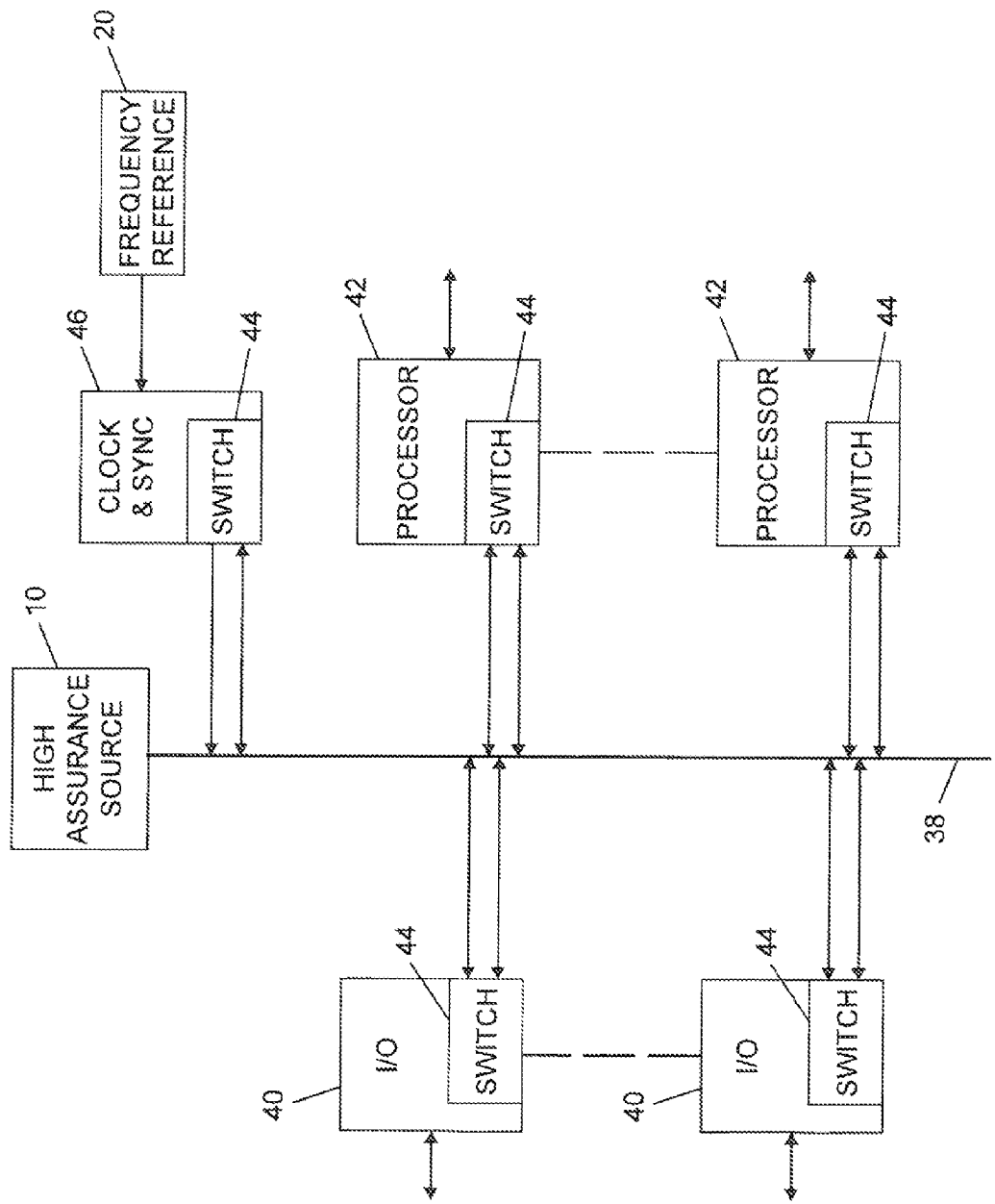
FIG. 2 is a block diagram depicting a second illustrative embodiment of a system according to the invention, including a distributed architecture with a single bus for both control and data.

FIG. 2 illustrates the present invention as applied to a system having a distributed architecture, as in FIG. 1, but with only a single serial TDMA bus 38 carrying both data and control. As in the system of FIG. 1, control is effected by the high assurance source 10. The ports 40 and the channels 42 are connected to the bus 38, each through its own internal switch unit 44. In addition, a clock and sync circuit 46, which is connected to the frequency reference circuit 20, is also connected to the bus 38 through its internal switch unit 44.

Figure 5:
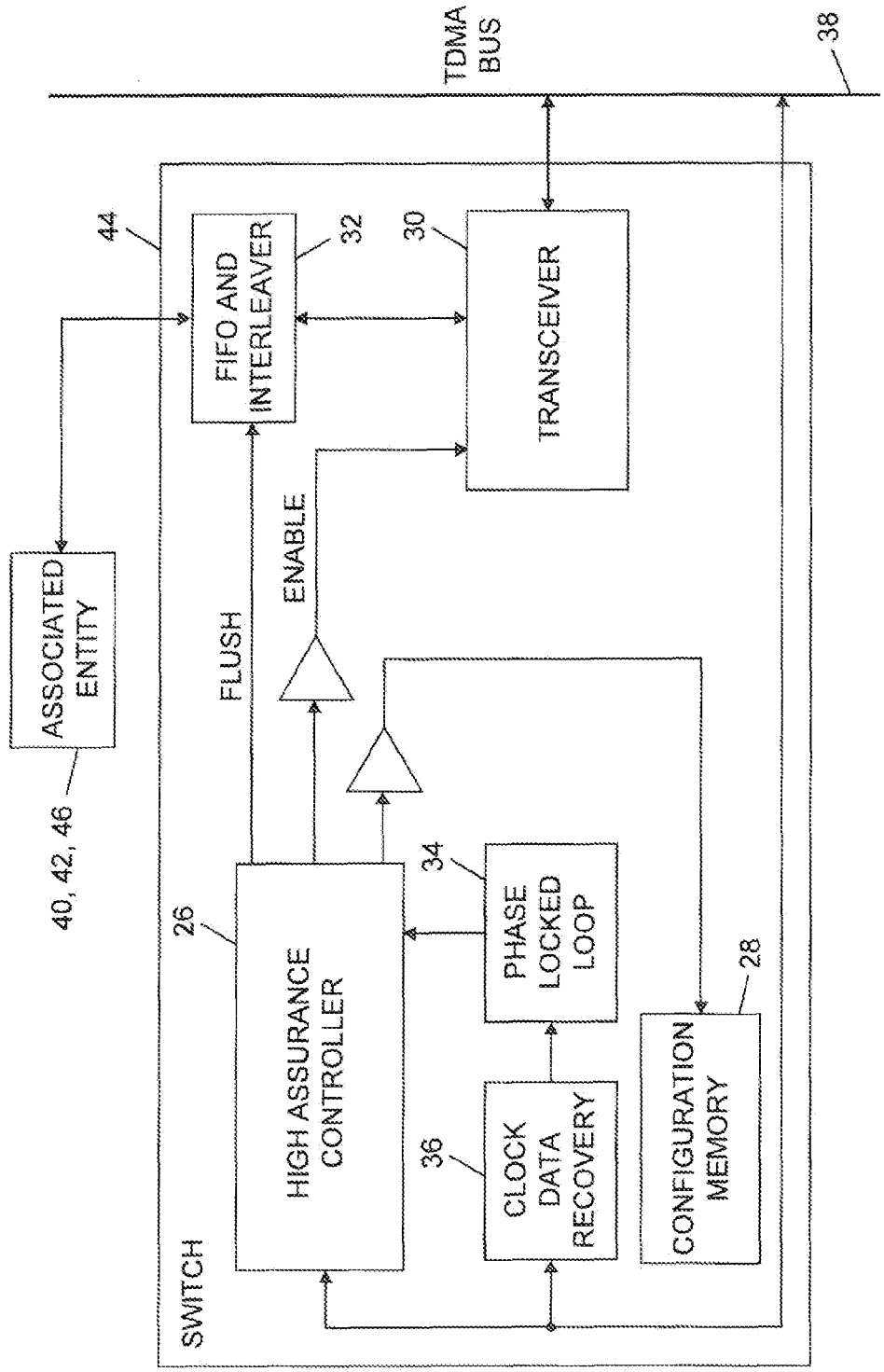
FIG. 5 is a block diagram of an illustrative embodiment of a switch unit according to the invention which may be utilized in the system shown in FIG. 2.

An exemplary switch unit 44 is illustrated in FIG. 5, from which it can be seen that the switch unit 44 is substantially the same as the switch unit 24 illustrated in FIG. 4, with the only substantial difference being that the switch unit 44 is connected only to the single TDMA bus 38, rather than to the two separate control and data busses 12 and 22.

In operation, the system of FIG. 2 operates substantially the same as the system of FIG. 1, except that control, clock and data signals all travel over the single TDMA bus 38.

Figure 3:
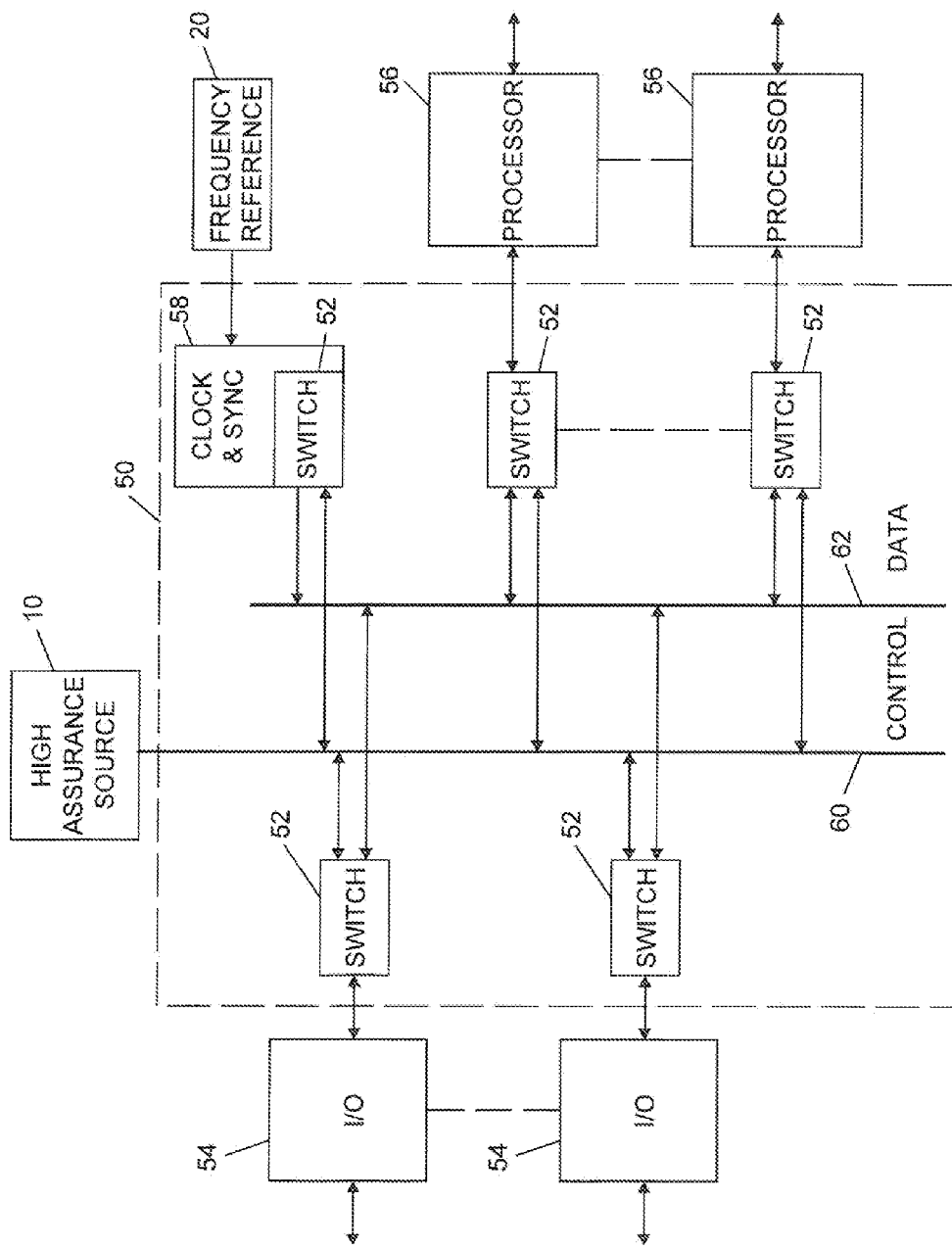
FIG. 3 is a block diagram depicting an illustrative embodiment of a system according to the invention having a centralized architecture.

FIG. 3 illustrates the present invention as applied to a system having a centralized architecture. In the system of FIG. 3, the components within the broken lines 50 and to which the high assurance source 10 is connected, may be implemented by an application specific integrated circuit (ASIC), wherein the ASIC 50 is connected through a number of internal switch units 52 to corresponding ports 54 and channels 56 of the system. In addition, the internal clock and sync circuit 58 is connected to the external frequency reference 20. The high assurance source 10 is connected to a control bus 60 within the ASIC 50, and all the switch units 52 are connected to the control bus 60 and to a data bus 62 within the ASIC 50. Preferably, the control and the data busses 60 and 62 are parallel TDMA buses, which greatly increases throughput as compared with the serial busses of the systems shown in FIGS. 1 and 2.

Figure 6:
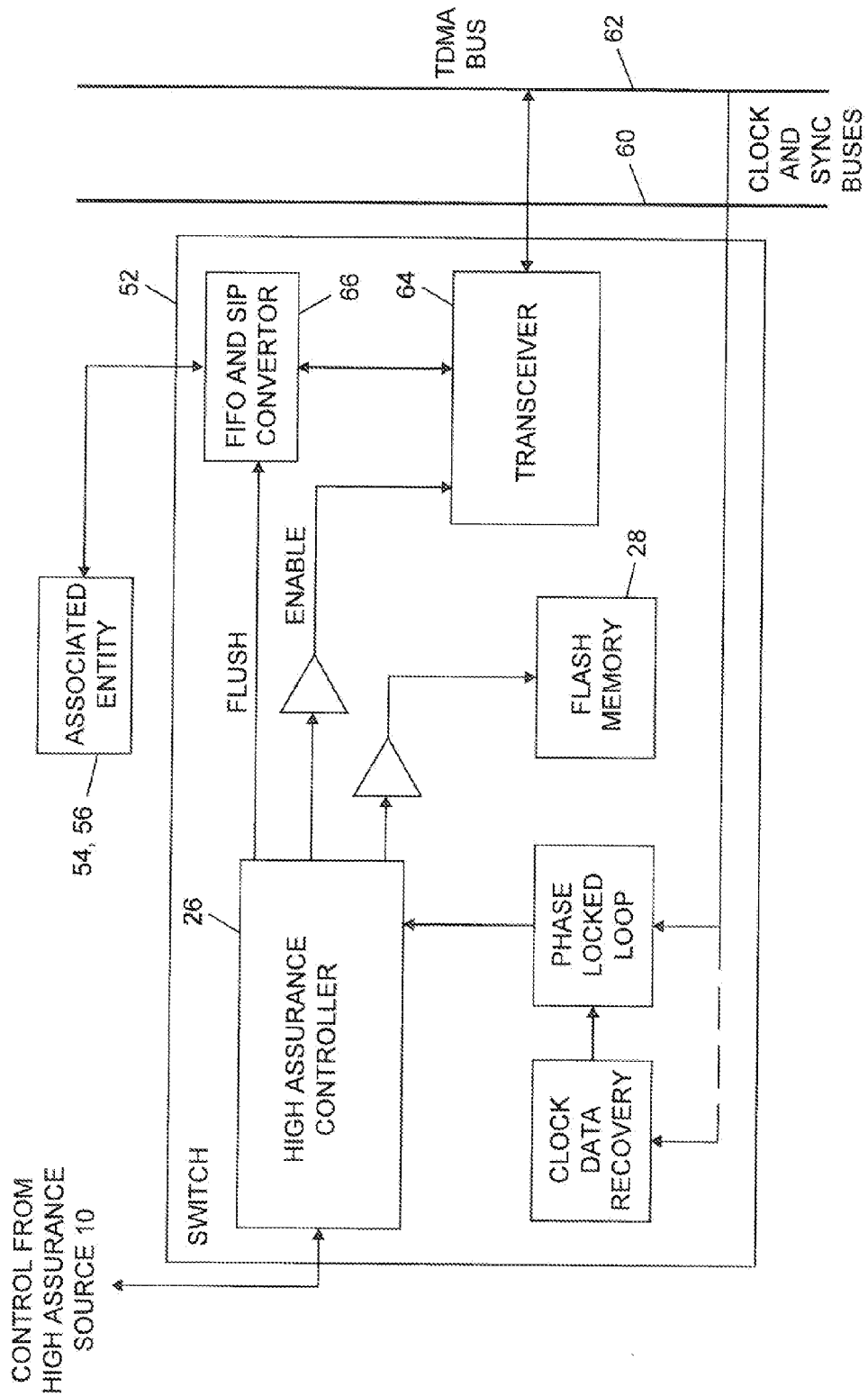
FIG. 6 is a block diagram of an illustrative embodiment of a switch unit according to the present invention which may be utilized in the system shown in FIG. 3.

An exemplary switch unit 52 is illustrated in FIG. 6, from which it is seen that the switch unit 52 is similar to the switch units 24 and 44. One difference is that a transceiver 64 has parallel connections to the data bus 62. Further, a first-in-first-out register and serial-to-parallel converter 66 is coupled between the transceiver 64 and the associated entity 54 or 56.

In operation, the system of FIG. 3 operates substantially the same as the systems of FIGS. 1 and 2. Accordingly, FIGS. 1 to 3 illustrate embodiments of the present invention having both distributed and centralized architectures. Because the systems of FIGS. 1 and 3 use time division multiple access (TDMA) data busses 22, 38 and 62, persons skilled in the art will understand that accurate time synchronization must be maintained among all the ports and channels of the system. Synchronization pulses must be produced and detected to maintain ordered operation. Otherwise, any given pair of entities to which time slots have been assigned may fail to communicate fully with one another during the assigned slots as they attempt on their own to transmit or receive data on the busses. Lost data must be resent, and the efficiency of the system is compromised.

Figure 7:
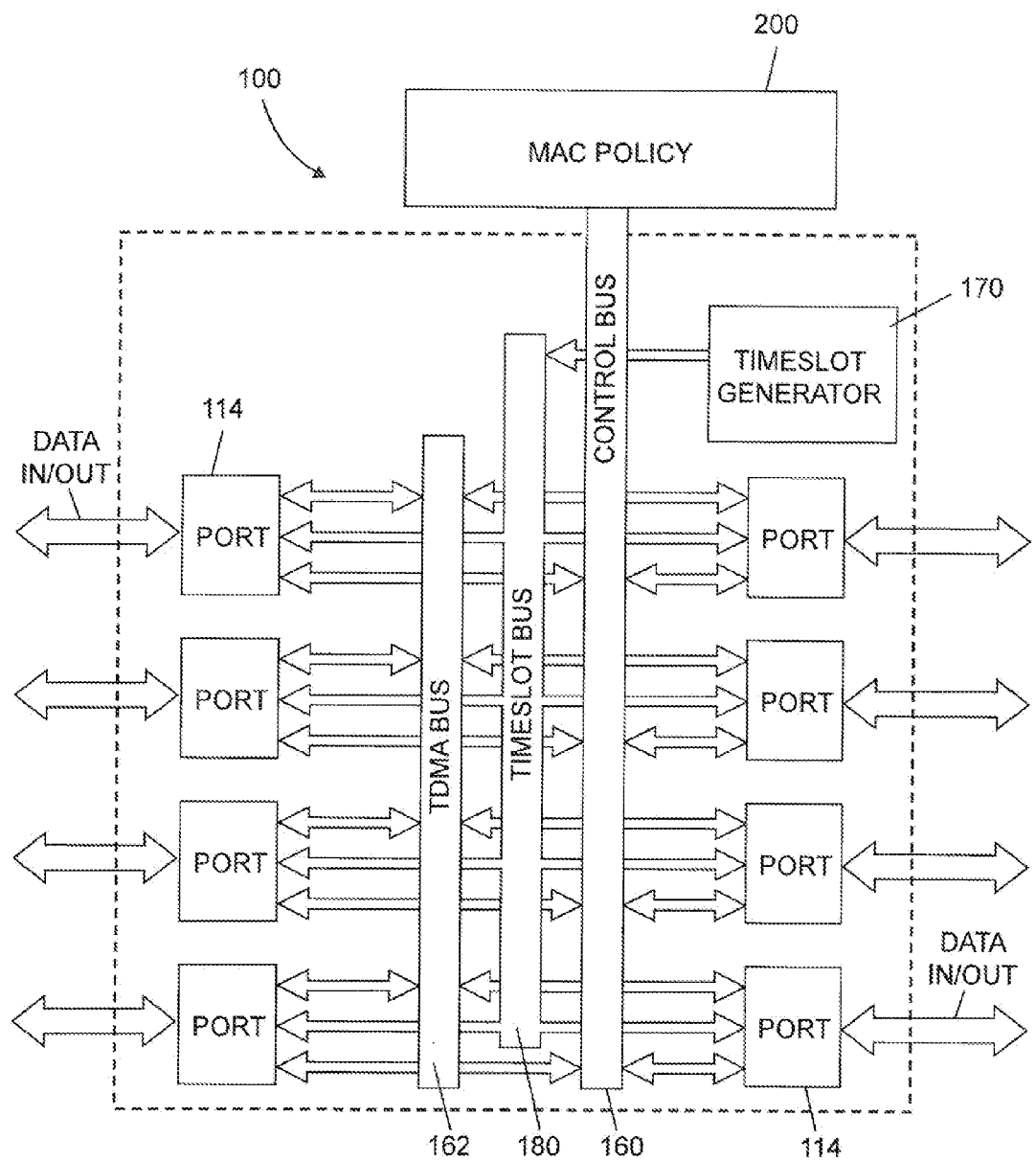
FIG. 7 is a schematic block diagram of a secure communications system according to another embodiment of the invention wherein synchronization of data exchanged among ports of the system is assured.

FIG. 7 illustrates another embodiment of a time division multiplex communications network or system 100 according to the invention. In the system 100, secure communication paths are established among pairs of peripheral devices or ports 114 with matching levels of security, without the use of sync pulses typically required when specific time slots are assigned to each pair of ports. While eight ports 114 are shown in FIG. 7, it will be understood that the system 100 is scalable in that more or fewer of the ports 114 can be accommodated. Unlike prior TDM and TDMA communications systems, the ports 114 in the system 100 cannot lose time slot synchronization.

Each port 114 may operate on a medium access control (MAC) layer of the system 100 according to, for example, a known Reduced Media Independent Interface (RMII) standard wherein each port contains, e.g., a 144 bit buffer (4×36) for data when transmitted from the port onto a system data bus 162, and a 36 bit buffer for data received off of the bus 162. It is also preferred that each port 114 perform control line conditioning with respect to control data received at the port from a bi-directional control/status bus 160 over, e.g., a first control line CRS/DV (carrier sense/data valid), and control data transmitted from the port to the control/status bus 160 over, e.g., a second control line TE (transmit enable). While substantially similar, there are timing differences between the CRS/DV and the TE control data signals, and the port 114 preferably operates to convert the CRS/DV signal it receives to a TE signal which it transmits. The use of the larger transmit buffer then provides sufficient look ahead time to allow for the conversion.

Each port is provided with a unique fixed address comprising, e.g. nine bits with a Hamming distance of, e.g., three bits so that the detected addresses of any two ports must differ from one another by at least three bits to avoid an error condition. In this case, it can be shown that 32 unique addresses will be available for identification of the ports 114. (Minimum number of unique addresses=$2^{(N-(D+1))}$ where N is number of address bits, and D is the Hamming distance in bits.)

The bi-directional control/status bus 160 provides an interface between a system administrator or determined MAC policy 200, and each of the ports 114. The MAC policy 200 may be implemented, for example, by one or more system processors and/or controllers that have been configured and programmed in a manner known to persons skilled in the art. The bus 160 also interfaces with a port address time slot generator 170 the configuration and operation of which is described later below.

The data bus 162 serves to provide data communication paths between pairs of the ports 114 having matching levels of security during corresponding time slots, as determined by the system administrator or MAC policy 200. For example, the bus 162 may be 36 bits wide, and loaded or unloaded with data from or to buffers in the ports at a 100 MHz rate to provide a maximum throughput of 3.6 Gbps. Each port 114 may send and receive, e.g., two data bits and one control bit to and from the bus 162 in a single 20 nsec period, i.e., at a 50 MHz rate.

Figure 8:
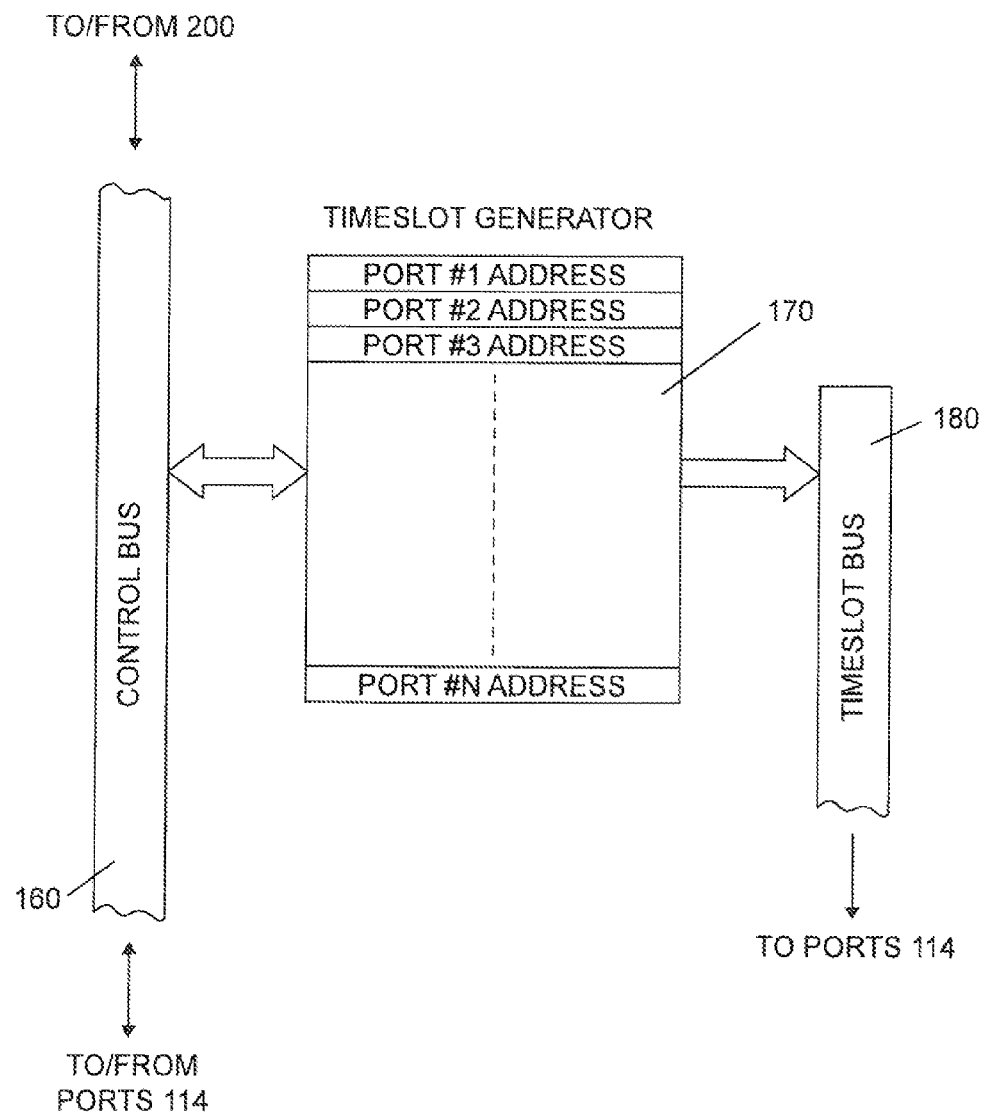
FIG. 8 is a schematic block diagram of a time slot generator provided in the system of FIG. 7 according to the invention.

The port address time slot generator 170 is coupled to the control bus 160 in the system 100 in FIG. 7, and to a port address time slot bus 180 described below. As illustrated in FIG. 8, the time slot generator 170 may comprise a memory device or register such as, for example, a programmable read only memory (PROM) or equivalent component that can be configured to write each of the port addresses sequentially from a first (#1) port address to a last (#N) port address onto the time slot bus 180, in response to corresponding write signals supplied to the generator 170 over the control bus 160. See, e.g., U.S. Pat. No. 5,880,992 (Mar. 9, 1999) all relevant portions of which are incorporated by reference.

When the time slot generator 170 outputs the last port address, it is configured in a known manner to regenerate the sequence of port addresses again from the first port address to the last port address. The duration of each address word from the generator 170 corresponds to one time slot which, in the illustrated embodiment, is 10 nsec. If an error or other alarm condition is detected in the system 100, the MAC policy 200 may, for example, command the time slot generator 170 to place all zeroes on the time slot bus 180 and cause all traffic to halt immediately.

In the present embodiment, the time slot bus 180 is configured as a read-only bus which is coupled to each of the ports 114. The bus 180 affords a unique time slot to each port whenever the port's fixed or assigned address is present on the bus. During its afforded time slot, a given port may load or unload data onto or from the data bus 162 as explained below. The time slot bus 180 can be, for example, nine bits wide (the width of each port's fixed address) and arranged to operate at 100 MHz so as to provide time slots of 10 nsec duration selectively to the ports.

As mentioned, each port 114 has read-only access to the time slot bus 180, and the bus has a number of lines equal to the number of address bits allocated for each of the ports 114. The time slot generator 170 at one end of the time slot bus 180 generates one port address after another sequentially from the first to the last port address in continuous repeating cycles. For example, if there are ten ports 114 in the system 100, then at the beginning of time slot T0, the time slot generator 170 outputs the address of port 1; at the beginning of time slot T1, the generator 170 outputs the address of port 2; and so on through time slot T9, at which time the generator 170 outputs the address of port 10. At the beginning of time slot T10, the generator 170 starts to repeat the sequence of port addresses beginning with the address of port 1, and so on in a recurring manner.

In addition to its own address, a given port 114 is associated with or is assigned (via the MAC policy 200 and the control bus 160) the address of another port whose data can be read by the given port according to the security policy of the system 100. When the given port detects the presence of its own fixed address on the time slot bus 180, the port is configured to write any outbound data onto the data bus 162 during the corresponding time slot. When the given port detects the presence of the assigned port address on the time slot bus 180, the port is configured to read any data that is present on the data bus 162 during the corresponding time slot.

In view of the foregoing description and according to the invention, the time slot bus 180 obviates the need for timing pulses typically used in TDMA communications systems while assuring that all the ports will send and receive desired data synchronously and without error. In the system 100 in FIG. 7, each port 114 has a permanent address unique from the addresses of the other system ports. While the disclosed embodiment uses Hamming distance 3, meaning that at least three bits in the binary representation of a given port address must change before resulting in another valid address, other distances and/or error correction coding may be employed depending on the level of security desired for the system 100.

Example

Assume two ports A and B, each having a unique permanent address, are allowed to communicate with one another under the security policy for the system 100, and that ports A and B have data to exchange with one another. The system administrator or MAC policy 200 provides port A with port B's address, and provides port B with port A's address. Thus, each of the two ports now know two addresses, namely, their own (i.e., permanent or hardwired) address, and the address assigned to them by the MAC policy 200.

When either port A or port B reads or detects its own address on the time slot bus 180 during a certain time slot, the port writes the data it desires to send to the other port onto the data bus 162 during the time slot. When either port A or port B detects the address of the other port on the time slot bus 180 during a certain time slot, the port reads the data that was placed on the data bus 162 by the other port within the time slot. Thus, during the time slot that port A's permanent address is present on the time slot bus 180, port A will transmit and port B will receive. And during the time slot that port B's permanent address is present on the time slot bus 180, port B will transmit and port A will receive.

Accordingly, pairs of the ports 114 in the system 100 cannot lose sync with one another with respect to the timing and exchange of communications allowed between them by the system security policy. As long as port A is provided with port B's address, port A will never communicate with any other port. An incorrectly generated or detected address will result in no activity. In the event a generated address is altered by three bit flips and the altered address happens to be valid, such would simply allow the port pair associated with that address to communicate out of turn (i.e., the port whose permanent address is the same as the altered address will transmit, and only the port authorized to read the transmitted data will still do so). That is, it is not possible for any given port to communicate with another port except for a port that was assigned to the given port.

Moreover, the inventive system 100 can support the so-called Bell and LaPadula "data diode", which is an important multi-level security consideration wherein data written by a given node can be read only by another node having the same or a higher level of security than that of the given node. Specifically, the system 100 can perform such a function by assigning one of the ports 114 with an additional address, referred to as a "null time slot" address, and by omitting the latter address from the output of the time slot generator 170.

For example, assume port A is allowed to transmit to port B, but is not allowed to receive any data in return from port B. In such a case, the system administrator or MAC policy 200 would provide port B with port A's address, and provide port A with the null time slot address. Thus, as explained above, during a time slot when port A's address is present on the time slot bus 180, port A will write its data on the data bus 162, and port B will be able to read the data written by port A on the data bus. During a time slot when port B's address appears on the time slot bus 180, port B will transmit its data, but no port (including port A) will be enabled to read the data provided port B's address has not been assigned to any of the other system ports by the system MAC policy 200.

Figure 9:
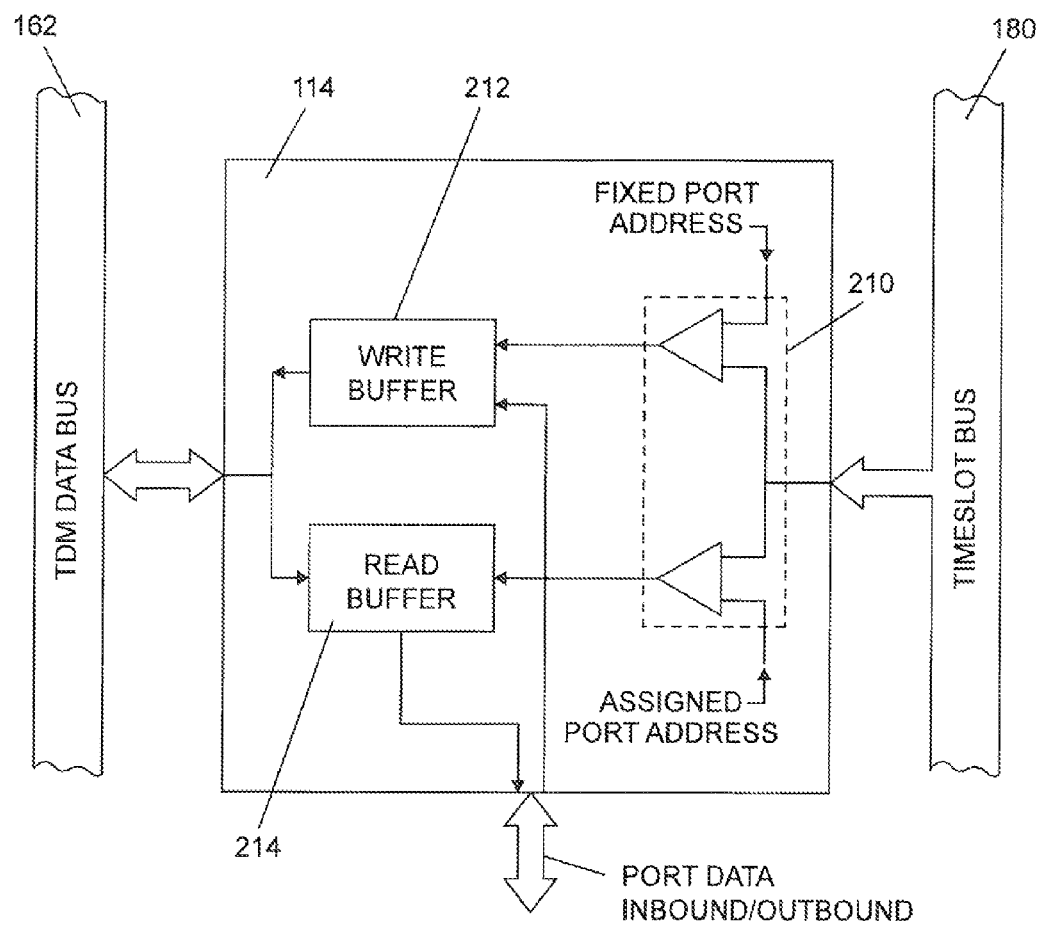
FIG. 9 is a block diagram of one of the ports in the system of FIG. 7.

FIG. 9 is a block diagram of a given one of the ports 114 in the system 100 of FIG. 7. The port includes a digital magnitude comparator array 210 that operates continuously to compare the recurring sequence of port addresses placed on the time slot bus 180 by the time slot generator 170, with the port's own fixed or permanent system address. When the given port's address is sensed on the bus 180 by the comparator 210 during a corresponding time slot, the comparator enables a write buffer 212 of, e.g, a 4×36 or 144 bit size to deliver any outbound data held in the buffer 212 from the port 114 to the data bus 162 during the time slot. When the address of an assigned port whose data the given port 114 can receive is sensed on the time slot bus 180 by the comparator 210 during a corresponding time slot, the comparator enables a read buffer 214 of, e.g., a 36 bit size to read and hold any data that the assigned port placed on the data bus 162 during the time slot.

While exemplary embodiments of the present invention have been disclosed herein, it will be appreciated by those of skill in the art that various adaptations and modifications to the disclosed embodiments are possible. For example, various busses and components of the disclosed systems and ports may be redundant and combined with alarm circuits in a known manner to meet a desired level of security. It is therefore intended that the invention be defined only by the spirit and scope of the appended claims.

I claim:

1. A secure communications system or network, comprising:
   a security policy source for defining a certain security policy for communications to be exchanged among ports of the system;
   a control bus coupled to the security policy source;
   two or more ports coupled to the control bus, wherein each port has a different fixed port address and any given port is permitted under the security policy to transmit information or data only to another port to which the address of the given port has been provided by the security policy source, and the security policy source is operative to provide the given port an address of another, if any, from which the given port is permitted under the security policy to receive information or data;
   a data bus coupled to the ports and constructed and arranged to communicate information or data among the ports as permitted by the security policy;
   a time slot generator constructed and arranged to output the fixed port address of each of the ports sequentially in a recurring manner; and
   a time slot bus coupled to the output of the time slot generator and to each of the ports, and wherein each port is configured so that:
   (a) only when a given port detects the presence of its fixed port address on the time slot bus, the port is operative to write desired outbound data onto the data bus during a corresponding time slot; and
   (b) only when the given port detects the presence of another port address on the time slot bus which other address corresponds to a port whose address has been provided to the given port by the security policy source, the given port is operative to read data from the data bus during a corresponding time slot.

2. A secure communications system according to claim 1, wherein the time slot bus is configured as a read only bus.

3. A secure communications system according to claim 1, wherein the fixed addresses of the ports differ from one another by a certain Hamming distance.

4. The communications system of claim 3, wherein each fixed address comprises nine bits, and the Hamming distance is three.

5. A secure communications system according to claim 1, wherein the time slot generator includes a memory device or register configured to store the fixed addresses of each of the ports.

6. The communications system of claim of claim 5, wherein the memory device or register is a read only memory.

7. A secure communications system according to claim 1, wherein the security policy source is operative to provide a given port with a null address that is not among the fixed port addresses output by the time slot generator, so that the given port does not read data from the data bus in response to an output of the time slot generator.

8. A secure communications system according to claim 1, wherein certain components of the system and the ports are provided and arranged redundantly to meet a desired level of security.

9. A method of communicating information or data among ports in a secure communications system or network, comprising the steps of:

providing a security policy source for implementing a desired security policy for the system, and coupling the security policy source to a system control bus;

defining a different fixed port address for each of a number of system ports, and coupling each port to the system control bus;

providing a given port with an address of another port, if any, from which other port the given port is permitted to receive information or data under the security policy;

coupling each of the ports to a data bus arranged for communicating data among the ports as permitted by the security policy;

arranging a time slot generator for outputting the fixed port address of each of the ports sequentially in a recurring manner;

coupling a time slot bus to the output of the time slot generator and to each of the ports;

writing desired outbound data from a given port onto the data bus when the given port detects its fixed port address on the time slot bus; and reading data from the data bus by the given port when the given port detects another port address on the time slot bus which other address has been provided to the given port by the security policy source.

10. The method of claim 9, including configuring the time slot bus as a read only bus.

11. The method of claim 9, including defining the fixed port addresses of the ports so that the addresses differ from one another by a certain Hamming distance.

12. The method of claim 11, including defining each of the fixed port addresses with nine bits, and setting the Hamming distance at three.

13. The method of claim 9, including providing the time slot generator in the form of a memory device or register for storing the fixed port addresses of each of the ports.

14. The method of claim 13, wherein the memory device or register is a read only memory.

15. The method of claim 9, including providing a given port with a null address and omitting the null address from among the fixed port addresses output by the time slot generator, thereby precluding the given port from reading data from the data bus in response to an output of the time slot generator.

16. The method of claim 9, including meeting a desired level of security by making certain components of the system and the ports redundant.

* * * * *